United States Patent

Carr et al.

Patent Number: 6,163,542
Date of Patent: *Dec. 19, 2000

[54] VIRTUAL PATH SHAPING

[76] Inventors: David Walter Carr, 16 Sarrazin Way, Nepean, Ontario, Canada, K2J 3Z5; Denny L. S. Lee, 16 Bannock Crescent, Kanata, Ontario, Canada, K2K 2P8

[*] Notice: This patent issued on a continued prosecution application filed under 37 CFR 1.53(d), and is subject to the twenty year patent term provisions of 35 U.S.C. 154(a)(2).

[21] Appl. No.: 08/924,657

[22] Filed: Sep. 5, 1997

[51] Int. Cl.[7] .................................................. H04L 12/28
[52] U.S. Cl. ........................... 370/399; 370/395; 370/397
[58] Field of Search ..................................... 370/412, 413, 370/414, 415, 418, 395, 397, 230, 235, 399

[56] References Cited

U.S. PATENT DOCUMENTS

| | | |
|---|---|---|
| 5,629,928 | 5/1997 | Calvignac et al. . |
| 5,793,747 | 8/1998 | Kline ........................................ 370/230 |
| 5,828,653 | 10/1998 | Goss ......................................... 370/230 |
| 5,864,540 | 1/1999 | Bonomi et al. ......................... 370/235 |
| 5,872,769 | 2/1999 | Caldara et al. ......................... 370/230 |
| 5,917,822 | 6/1999 | Lyles et al. ............................. 370/395 |
| 5,946,297 | 8/1999 | Calvignac et al. ..................... 370/230 |
| 5,953,338 | 9/1999 | Ma et al. ................................. 370/395 |
| 5,959,993 | 9/1999 | Varma et al. ........................... 370/397 |

FOREIGN PATENT DOCUMENTS 596 624  5/1994  European Pat. Off. ........ H04L 12/56

OTHER PUBLICATIONS

M.G. Hluchyj, et al. publication entitled "Queueing Disciplines For Integrated Fast Packet Networks"; published Jun. 14, 1992; pp. 0990–0996.

J.W. Roberts publication entitled "Virtual Spacing For Flexible Traffic Control"; International Journal of Communication Systems, vol. 7; published 1994; pp. 307–318.

The ATM Forum Technical Committee; "Traffic Management Specification Version 4.0"; Apr. 1996.

Ken–ichi Sato et al; "Broad–Band ATM Network Architecture Based on Virtual Paths"; IEEE, vol. 8, No. 8, Aug. 1990.

Ann Demirtjis et al; "How to Encourage Cheating with Virtual Path Policing in ATM Networks"; IEEE IC3N 1995.

John Burgin et al; "Broadband ISDN Resource Management: The Role of Virtual Paths"; IEEE, Sep. 1991.

Primary Examiner—Chi H. Pham
Assistant Examiner—Brenda H. Pham
Attorney, Agent, or Firm—Marks & Clerk

[57] ABSTRACT

An apparatus and a method for shaping ATM cell traffic emitted onto a virtual path connection in an ATM network are described. Component virtual channel connections are arbitrated at an aggregation point utilizing a hierarchical, multi-level arbitration technique. The technique provides both virtual path shaping and controllability of underlying virtual channel connections with an improved fairness performance amongst all the aggregating virtual channel connections.

15 Claims, 5 Drawing Sheets

VIRTUAL PATH SHAPING

FIELD OF THE INVENTION

This invention relates to data communications networks utilizing ATM technology and more particularly to an apparatus and a method for shaping multi-service category cell traffic onto virtual path connections while providing fair share arbitration between aggregating virtual channel connections.

BACKGROUND OF THE INVENTION

Asynchronous transfer mode (ATM) technology is rapidly being recognized as the technology of choice for broad-band data communications. ATM cells having a fixed number of bytes can efficiently accommodate multimedia traffic such as video, voice and data.

ATM cell traffic between nodes in an ATM network is carried on what are known as virtual connections (VC) Traffic from end user to end user through a plurality of intermediate nodes is carried on virtual channel connections (VCC). Since traffic from several sources may have a common destination it is known to combine virtual channel connections onto a virtual path connection (VPC) in order to simplify the processing of traffic through the network. When virtual channel connections are aggregated onto a virtual path connection, the individual virtual channel connections are essentially transparent to the intermediate ATM nodes and this allows a simpler networking model and higher manageability. A virtual path connection is defined as a logical grouping of multiple virtual channel connections into one virtual connection.

Although the aggregation of virtual channel connections onto a common path simplifies traffic management, concerns have been expressed that individual virtual channel connections may not all be treated fairly when aggregated onto a virtual path connection. Demirtjis and Petr (IEEE IC3N, 1995 "How to Encourage Cheating with Virtual Path Policing in ATM Networks") have found that virtual channel connections which are in compliance with predefined transmission parameters may be adversely affected by non-compliant traffic when aggregated onto a virtual path.

U.S. Pat. N0. 5,629,928 which issued May 13, 1997 to Calvignac et al discloses one technique for controlling traffic flow in a virtual path communication system wherein queues allocated as needed from a pool of free queues are used to store all incoming data cells having the same virtual channel identifier.

SUMMARY OF THE INVENTION

It is an object of the present invention to provide shaping of virtual path traffic through an ATM network utilizing a multi-level arbitration technique.

Therefore, in accordance with a first aspect of the present invention there is provided, in an ATM data communication network having node-to-node virtual connections and end-to-end user virtual channel connections, wherein the virtual channel connections are aggregated at an aggregation point onto virtual path connections, an apparatus for fairly shaping ATM cell traffic, wherein the cell traffic is comprised of various categories of service and quality of service parameters, onto the virtual path connection, the apparatus comprising: buffers to receive and hold in queues cells from each of the virtual channel connections; multi-level arbitration means to hierarchically arbitrate between the virtual channel connections cell traffic and determine an order of service of the cells; and a virtual path connection shaper to control egress emission of cells from the arbitration means onto the virtual path connection.

In a preferred embodiment of this aspect of the invention the apparatus includes first and second level arbiters wherein the first level arbiter arbitrates between a first group based on service categories and a second arbiter determines priority as between the first group.

In accordance with a second aspect of the present invention there is provided in an ATM data communications network having node-to-node virtual connections and end-to-end user virtual channel connections wherein the virtual channel connections are aggregated at an aggregation point onto virtual path connections, a method for fairly shaping ATM cell traffic comprised of various categories and quality of service parameters onto the virtual path connection, the method comprising the steps of: queuing the virtual channel connection cell traffic in separate queuing buffers; arbitrating between the cell traffic in the separate queuing buffers using a multi-level arbitration means; and shaping the arbitrated cell traffic with a virtual path connection shaper in order to fairly emit the cell traffic onto the virtual path connection.

BRIEF DESCRIPTION OF THE DRAWINGS

The invention will now be described in greater detail with reference to the attached drawings wherein.

DETAILED DESCRIPTION OF THE INVENTION

Known virtual path connection (VPC) aggregation is typically performed at the egress direction of an ATM switch. Such VPC aggregation points do not usually have VP level shaping capability and, therefore, cannot police the aggregated cell stream in downstream nodes. Other VPC aggregation points may have per-VC shaping capability, therefore the VP must first be aggregated before it is shaped. This method does not allow controllability of the underlying VCCs at the VP aggregation point. These controllable elements include such items as per-VC buffer management, rate-control and fairness amongst aggregating VCCs.

Figure 1:
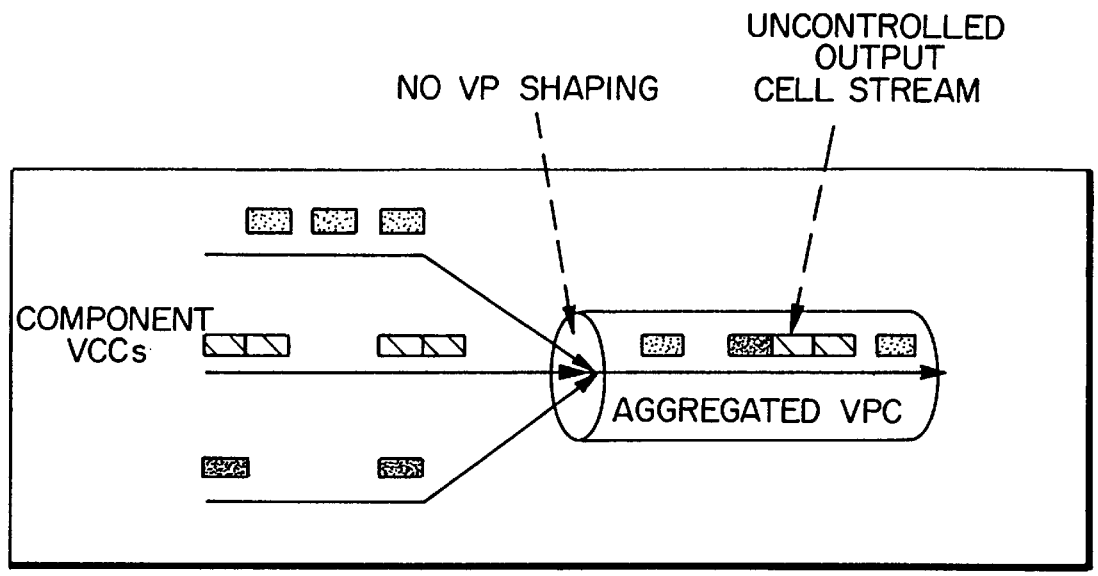
FIG. 1 is one prior art method of forming a virtual path connection at an aggregation point.

FIG. 1 illustrates a logical aggregation at a VPC aggregation point. As shown, the component VCCs are multiplexed onto the virtual path connection without any virtual path shaping. This results in an uncontrolled output cell stream which is unlikely to provide fair sharing of the virtual channel connection cells. Without shaping, the aggregated VPC traffic is likely to include irregular flow.

Figure 2:
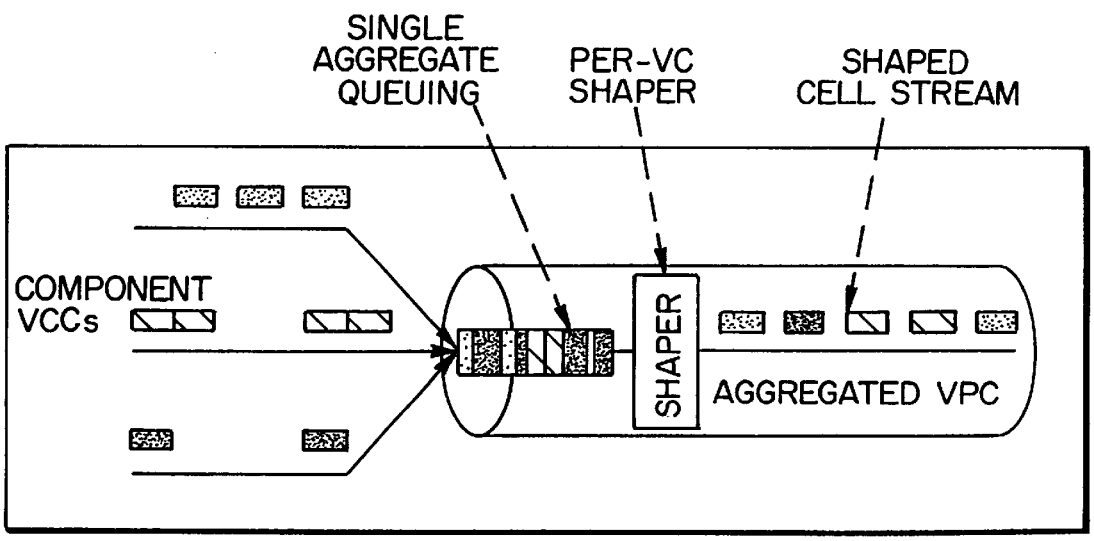
FIG. 2 represents a second prior art method of forming a virtual path connection at an aggregation point.

FIG. 2 illustrates a VPC aggregation point with shaping after aggregation. As in FIG. 1 the component VCCs are aggregated at the input to the VPC. A single aggregate queue stores the incoming component VCCs prior to the per-VC shaper which polices traffic on the VPC. There is, however, no attempt to provide fair share arbitration between the component VCC traffic.

Figure 3:
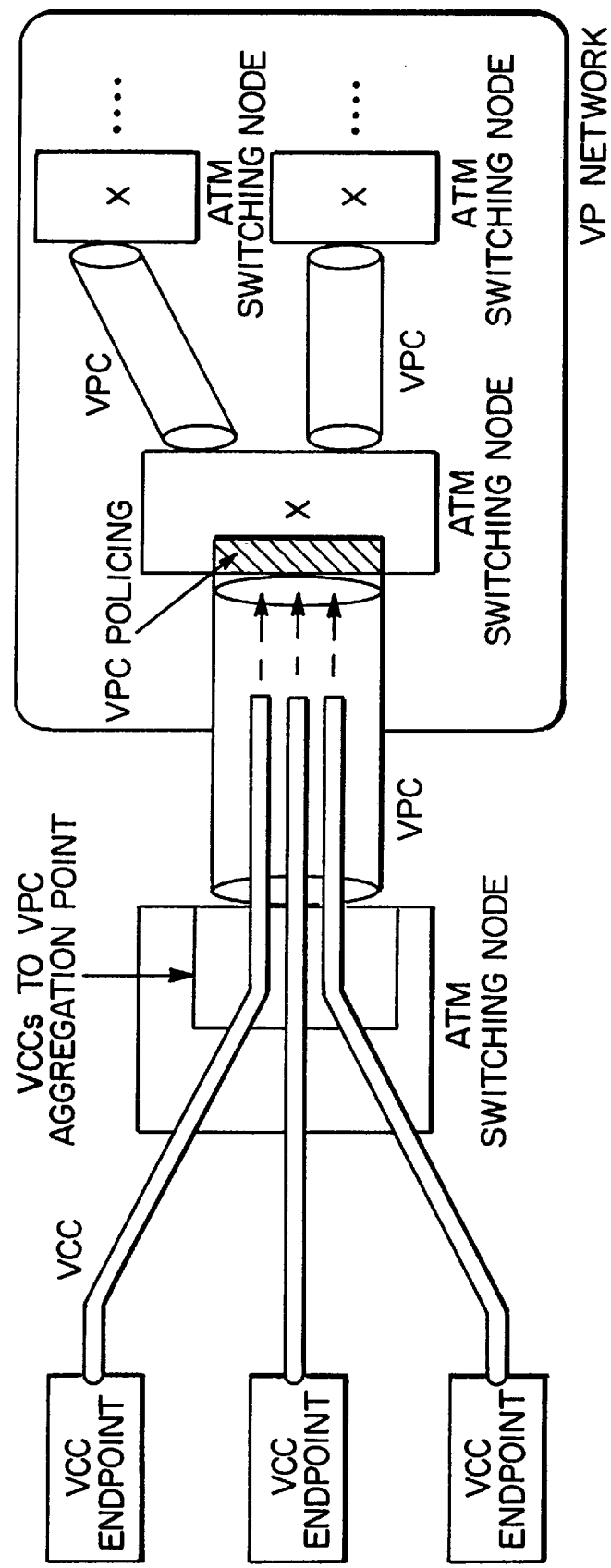
FIG. 3 is a block diagram of an ATM network with VPC aggregation.

The technique contemplated by the present invention provides VP aggregation shaping while maintaining per-VCC isolation amongst the aggregating VCCs. Such isolation makes it possible to maintain per-VC congestion control on each individual component VCC. For the purpose of this description the terms "component" and "aggregating" are used interchangeably. They both denote the underlying VCCs which constitute a VPC. A network block diagram is shown in FIG. 3.

The ATM Forum has defined five service categories relating to ATM cell traffic. The five service categories are: constant bit rate (CBR), real time variable bit rate (rt-VBR), non-real time variable bit rate (nrt-VBR), available bit rate (ABR) and unspecified bit rate (UBR). These categories can be divided into two main groups: real time and non-real time. For the real time service categories cell transfer delay (CTD) and cell delay variation (CDV) are both important quality of service (QoS) parameters. In light of these considerations the present invention relates to a hierarchical approach in which individual VCCs are logically grouped together with common service requirements. The technique for virtual path shaping according to the present invention is illustrated in FIG. 4.

Figure 4:
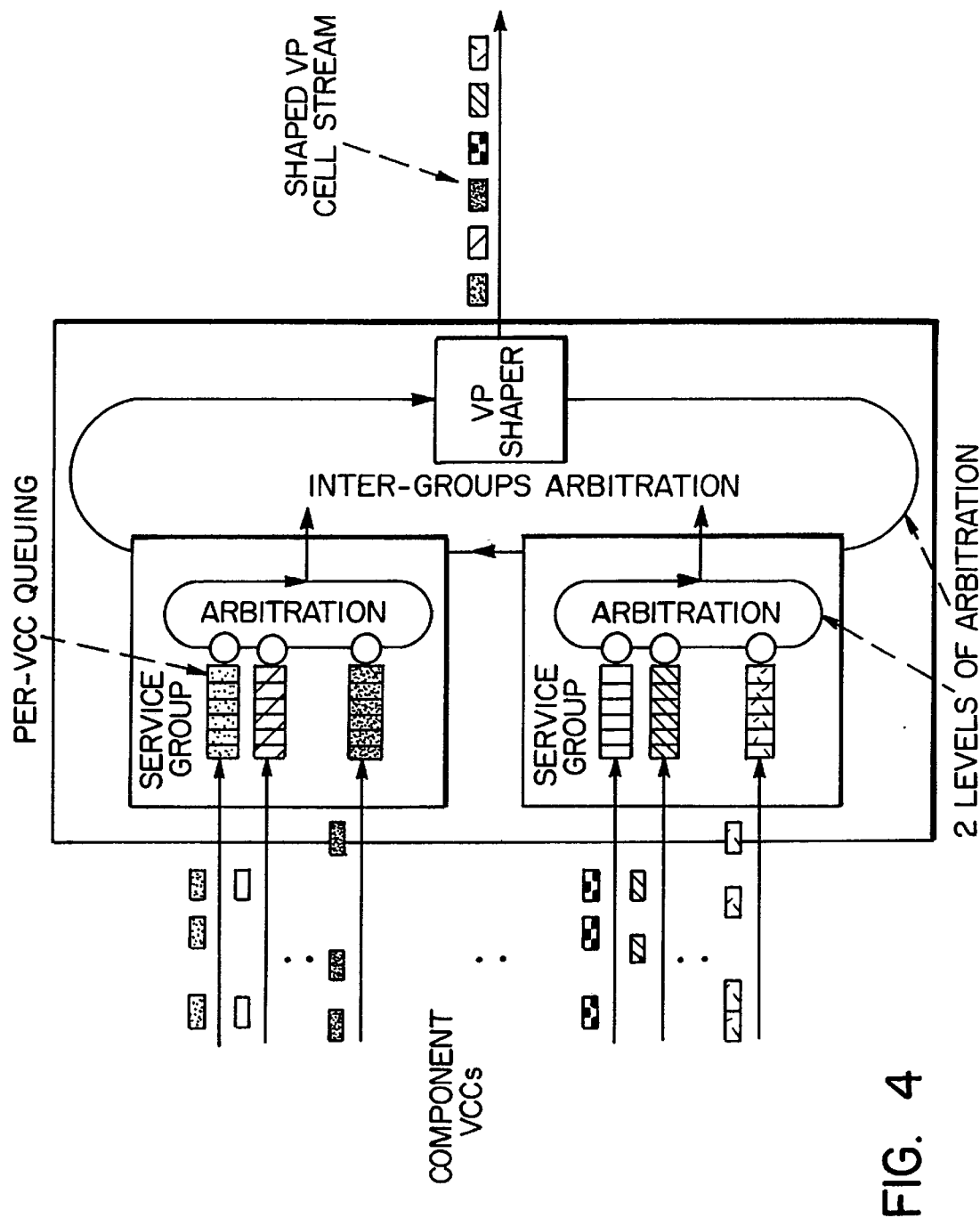
FIG. 4 illustrates the virtual path shaping technique of the present invention.

As shown in FIG. 4, each component VCC is individually queued in its respective per-VCC queue. As such any buffer management or congestion control technique can be applied to the isolated VCCs. This feature inherently allows better fairness as each connection's behaviour is isolated from one another. In view of the aforementioned definition of multiple service categories wherein each requires a different quality of service, the present invention addresses the relevant issue by introducing multiple arbitration hierarchies. The lowest level depicted in FIG. 4 is the service group level. All component VCCs within the same service group effectively share the same level of service as one unique arbitration technique is applied to all members of a particular service group. The arbitration can be, for example, a simple exhaustive round-robin technique, a weighted round-robin technique or a weighted fair queuing technique. The arbitration choice is dependent on the performance and implementation complexity desired. For the best fairness performance a per-VC weighted fair queuing is used. This technique, however, incurs the highest level of implementation complexity.

After the VCCs have been arbitrated as between service groups the next hierarchical level is to arbitrate amongst all the service groups. As a potential application of this technique it is possible to map the five service categories defined by the ATM Forum into five separate service groups. Otherwise, it is possible to map the real time service categories into one group and the non-real time service categories into the other. The usage and partition of the service groups are considered to be implementation decisions. Depending on the desired level of complexity versus performance, it is possible to choose from the various arbitration techniques discussed previously. For instance, if the service groups are mapped into real time and non-real time service categories, the intergroup arbitration can be as simple as exhaustive servicing with the real time group having absolute priority over the non-real time group. This gives the real time group's connections better delay performance.

The two levels of arbitration are ultimately controlled by the VP shaper. The shaper determines in the time domain when a cell can be emitted for the virtual path connection given certain traffic descriptors. These descriptors might include peak cell rate (PCR), sustained cell rate (SCR), and maximum burst size (MBS). Upon the determination that a cell can be emitted the intergroup's arbiter determines which service group is allowed to send and the chosen service group arbiter then further determines which component VCC should be transmitted. Once the VCC is determined the cell at the head of that per-VCC queue is extracted and transmitted.

With this VP aggregation technique it is possible to achieve both VP shaping and controllability of underlying VCCs with an improved fairness performance amongst all the aggregating VCCs.

Figure 5:
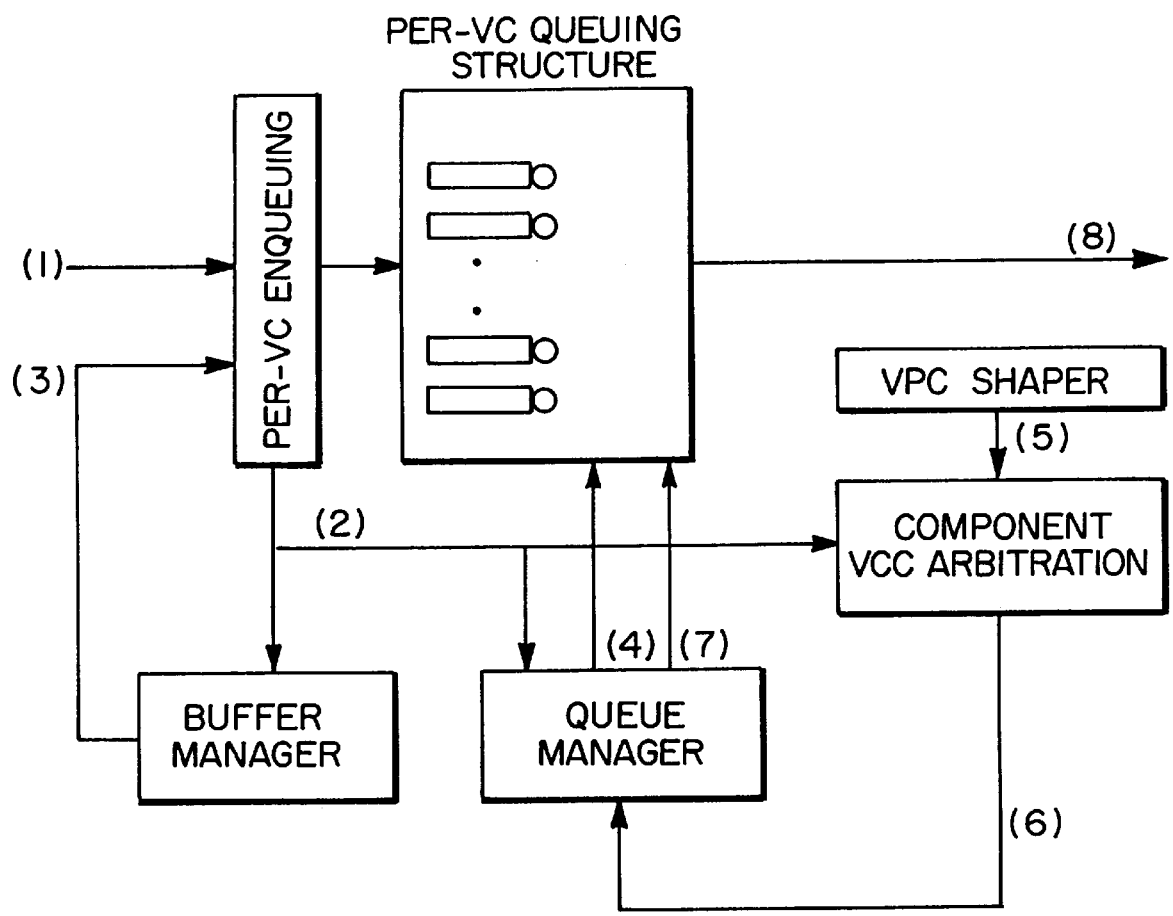
FIG. 5 is a functional block diagram of the vertical path shaping process.
Figure 6:
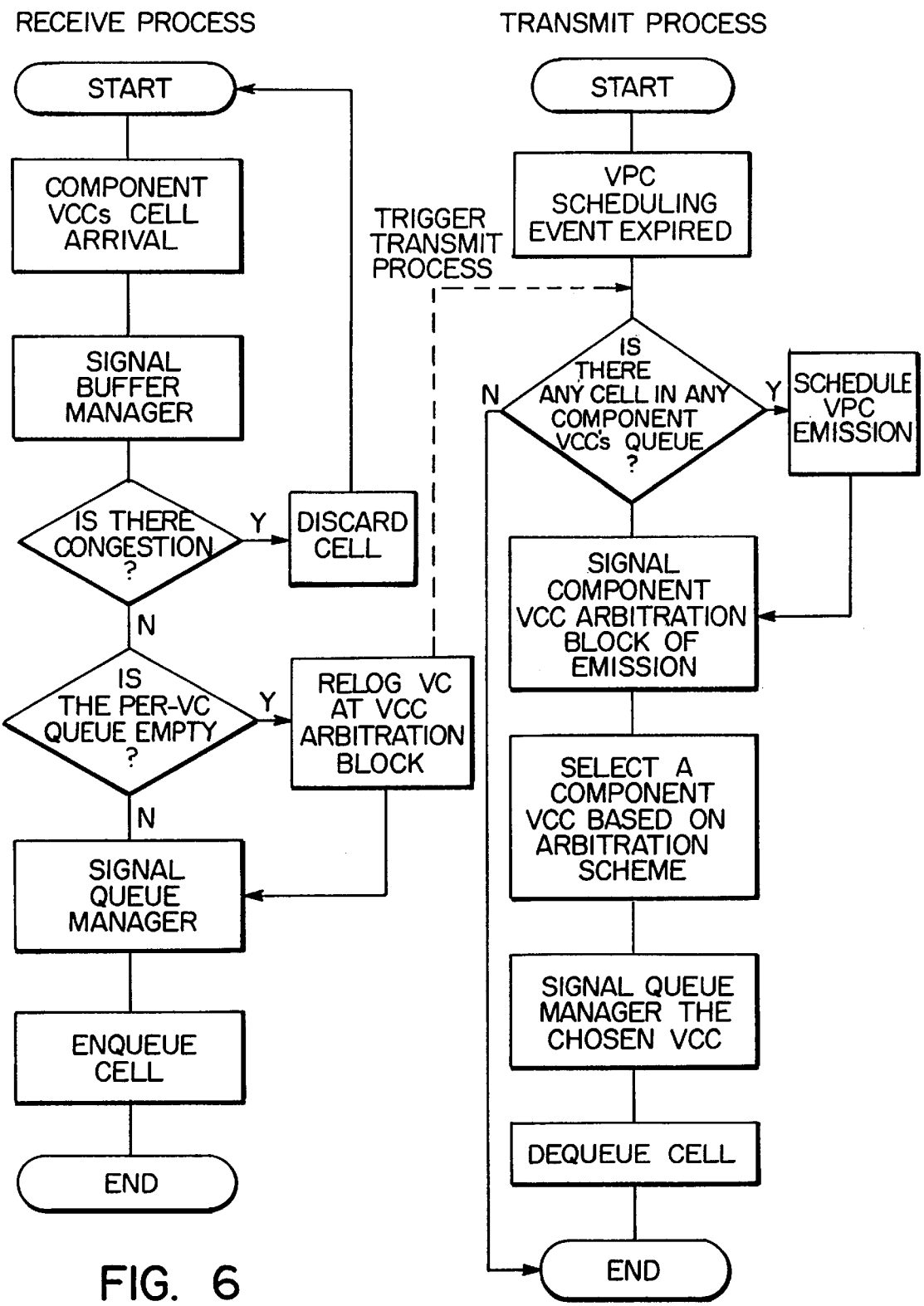
FIG. 6 is a flow diagram of the process depicted in FIG. 5.

FIGS. 5 and 6 provide, respectively, a function diagram and a flow diagram of the shaping process.

FIG. 5 sets out the following functional steps:

1) cell arrival event;
2) arrival notice;
3) discard decision based on current congestion condition;
4) queue manager determines the physical enquiring location;
5) VPC shaper scheduling cell emission in time domain;
6) VCC arbitration block signals the chosen component VCC given certain arbitration scheme;
7) queue manager dequeues the cell from the chosen component VCC; and
8) cell transmission FIG. 6 shows the steps in flow diagram format.

While one embodiment of the invention has been disclosed and illustrated, it will be apparent to one skilled in the art that variations and alternatives can be implemented without departing from the basic concept of the invention. It is to be understood that such variations and alternatives, to the extent possible, fall within the scope of the invention as defined by the appended claims.

What is claimed is:

1. A system for controlling aggregation of a plurality of Virtual Channel Connections (VCCs) onto a Virtual Path Connection (VPC) comprising:

a hierarchical arbitrator which firstly arbitrates amongst groupings of the plurality of VCCs to select one VCC from each grouping and secondly arbitrates among the respective VCCs selected from the groupings to identify a VCC which is to be aggregated onto the VPC; and a shaper to determine in time domain when a cell from said identified VCC being aggregated is to be emitted in accordance with descriptors associated with said VPC.

2. The system as defined in claim 1 wherein each of said groupings has a common service characteristic.

3. A system as defined in claim 2 wherein said common service characteristic is the category of service.

4. A system as defined in claim 2 wherein said common setice characteristic is quality of service parameters.

5. A system as defined in claim 1 wherein said arbitrator utilizes an exhaustive round-robin arbitration scheme to arbitrate among groupings of the plurality of VCCs.

6. A system as defined in claim 1 wherein said arbitrator utilizes a weighted round-robin arbitration scheme to arbitrate among groupings of the plurality of VCCs.

7. A system as defined in claim 1 wherein said arbitrator utilizes a weighted fair queuing arbitration scheme.

8. A method of controlling aggregation of a plurality of Virtual Channel Connections (VCCs) onto a Virtual Path Connection (VPC) comprising:

provoiding a hierarchical arbitrator to firstly arbitrate among groupings of the plurality of VCCs to select one VCC from each grouping and secondly to arbitrate amongst the respective VCCs selected from said groupings to identify a VCC which is to be aggregated onto said VPC; and providing a shaper to determine in time domain when a cell from said identified VCC being aggregated is to be emitted according to descriptors associated with said VPC.

9. The method of claim 8 wherein each of said groupings has a common service characteristic.

10. The method as defined in claim 9 wherein said common service characteristic includes similar quality of service parameters.

11. The method as defined in claim 9 wherein said common service characteristic includes category of service.

12. The method as defined in claim 11 wherein said category of service includes connections having real time traffic.

13. The method as defined in claim 12 wherein said real time traffic includes constant bit rate (CBR) and real time variable bit rate (rt-VBR) traffic.

14. The method as defined in claim 11 wherein said category of service includes connections having non-real time traffic.

15. The method as defined in claim 14 wherein said non-real time traffic includes non-real time variable bit rate (nrt-VBR) available bit rate (ABR) and unspecified bit rate (UBR) traffic.

* * * * *